(12) United States Patent
Hayashida et al.

(10) Patent No.: US 10,907,948 B2
(45) Date of Patent: Feb. 2, 2021

(54) MEASUREMENT APPARATUS AND BEARING

(71) Applicant: MITUTOYO CORPORATION, Kanagawa (JP)

(72) Inventors: Shuji Hayashida, Kawasaki (JP); Shozaburo Tsuji, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/713,346

(22) Filed: Dec. 13, 2019

(65) Prior Publication Data
US 2020/0217363 A1    Jul. 9, 2020

(30) Foreign Application Priority Data

Jan. 8, 2019   (JP) ................................. 2019-001313

(51) Int. Cl.
*G01B 5/00*     (2006.01)
*F16C 29/04*    (2006.01)

(52) U.S. Cl.
CPC .............. *G01B 5/00* (2013.01); *F16C 29/046* (2013.01); *F16C 2370/00* (2013.01)

(58) Field of Classification Search
CPC ...... F16C 29/04; F16C 29/045; F16C 29/046; F16C 29/0685; F16C 29/0695; G01B 5/00; G01B 5/043; G01B 7/042; G01B 7/044; G01B 7/046; G01B 11/043
See application file for complete search history.

(56) References Cited

U.S. PATENT DOCUMENTS

| | | | | |
|---|---|---|---|---|
| 2,906,563 A * | 9/1959 | Conner | ................... | F16C 29/12 384/30 |
| 4,664,534 A * | 5/1987 | Hanaway | ................ | F16C 29/04 384/30 |
| 5,158,373 A * | 10/1992 | Hanaway | ................ | F16C 29/04 384/30 |
| 5,320,430 A * | 6/1994 | Kobayashi | .............. | F16C 31/04 384/30 |
| 2015/0260220 A1 * | 9/2015 | Owada | ................... | F16C 29/045 384/53 |

FOREIGN PATENT DOCUMENTS

JP     2011-053046 A      3/2011
JP     2017137923 A  *   8/2017

\* cited by examiner

*Primary Examiner* — Phillip A Johnson
(74) *Attorney, Agent, or Firm* — Oliff PLC

(57) ABSTRACT

The measurement apparatus includes an outer cylinder, a shaft body longitudinally movable on the inner surface side of the outer cylinder, a plurality of bearing balls disposed between an inner surface of the outer cylinder and an outer surface of the shaft body, and a measurement part that measures a relative position between the outer cylinder and the shaft body, and a first density of the bearing balls in a first area having a first length shorter than a total length of the outer cylinder in a longitudinal direction from one end of the outer cylinder is larger than a second density of the bearing balls in a second area having a second length shorter than the total length of the outer cylinder centered on a center position in the longitudinal direction of the outer cylinder.

9 Claims, 6 Drawing Sheets

1

MEASUREMENT APPARATUS AND BEARING

CROSS-REFERENCE TO RELATED APPLICATIONS

The present application claims priority to Japanese Patent Application number 2019-1313, filed on Jan. 8, 2019. The contents of this application are incorporated herein by reference in their entirety.

BACKGROUND OF THE INVENTION

The present invention relates to a measurement apparatus and a bearing.

Conventionally, a measurement apparatus having a spline bearing is used. Japanese Unexamined Patent Application Publication No. 2011-053046 discloses a linear gauge having a ball spline bearing.

In a conventional linear gauge, if an external force is applied to a shaft of a spindle that slides through a bearing, the shaft inclines in the longitudinal direction, and the accuracy of the measurement apparatus is decreased. Therefore, there is a demand for a linear gauge using a bearing in which a shaft of a spindle is hardly inclined.

BRIEF SUMMARY OF THE INVENTION

The present invention focuses on these points, and an object of the present invention is to provide a measurement apparatus in which a shaft of a spindle that slides through a bearing is hardly inclined.

The first aspect of the present invention provides a measurement apparatus that comprises an outer cylinder, a shaft body longitudinally movable on the inner surface side of the outer cylinder, a plurality of bearing balls disposed between an inner surface of the outer cylinder and an outer surface of the shaft body, and a measurement part that measures a relative position between the outer cylinder and the shaft body, wherein a first density of the bearing balls in a first area having a first length shorter than a total length of the outer cylinder in the longitudinal direction from one end of the outer cylinder is larger than a second density of the bearing balls in a second area having a second length shorter than the total length of the outer cylinder, the second area being centered on a central position in the longitudinal direction of the outer cylinder.

The second aspect of the present invention provides a bearing that comprises an outer cylinder, a shaft body longitudinally movable on the inner surface side of the outer cylinder, and a plurality of bearing balls disposed between an inner surface of the outer cylinder and an outer surface of the shaft body, wherein a first density of the bearing balls in a first area having a first length shorter than a total length of the outer cylinder in the longitudinal direction from one end of the outer cylinder is larger than a second density of the bearing balls in a second area having a second length shorter than the total length of the outer cylinder, the second area being centered on a central position in the longitudinal direction of the outer cylinder.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Outline of a Measurement Apparatus S According to the Embodiment

Figure 1:
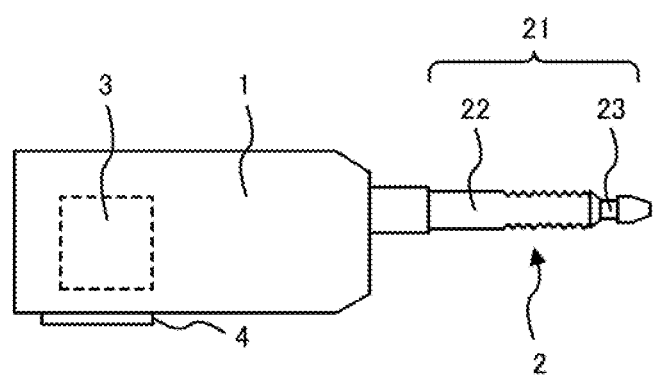
FIG. 1 shows a configuration of a measurement apparatus according to the embodiment.

FIG. 1 shows a configuration of a measurement apparatus S according to the embodiment.

The measurement apparatus S is, for example, a linear gauge. The linear gauge has a function of measuring a length, and is used to measure geometry of an object, for example. The measurement apparatus S includes a housing 1, a moving part 2, a measurement part 3, and a power supply part 4.

The housing 1 accommodates an electronic circuit, a scale, and the like of the measurement part 3 in the measurement apparatus S, which will be described later. The moving part 2 is moved in the longitudinal direction when a longitudinal force is applied. The moving part 2 includes a spline bearing 21, an outer cylinder 22, and a shaft body 23.

The spline bearing 21 has a function of smoothly moving the shaft body 23 in the longitudinal direction with respect to the outer cylinder 22 and improves the slidability. Further, the spline bearing 21 has a function of making it difficult for inclination to occur in the longitudinal direction due to an external force or the like (for example, a weight of the shaft body 23 itself, a weight of a component attached to the shaft body 23, or the external force) when the shaft body 23 moves in the longitudinal direction. The details of the spline bearing 21 will be described later.

The outer cylinder 22 has a cylindrical shape, and the shaft body 23 that can move in the longitudinal direction is provided on the inner side. The outer cylinder 22 is connected to the housing 1. The details of the outer cylinder 22 will be described later.

The shaft body 23 is longitudinally movable on the inner surface side of the outer cylinder 22. The shaft body 23 is, for example, a spindle. For example, when a user measures the geometry of an object to be measured with the measurement apparatus S, the shaft body 23 moves longitudinally due to the irregularities of the object while the tip of the shaft body 23 contacts the outer surface of the object to be measured. The details of the shaft body 23 will be described later.

The measurement part 3 has a function of measuring a relative position between the outer cylinder 22 and the shaft body 23 and outputting position information corresponding to the measured relative position. Specifically, the measurement part 3 outputs the position information indicating the position of the shaft body 23 with respect to the outer cylinder 22 when the shaft body 23 moves in the longitudinal direction of the outer cylinder 22.

The power supply part 4 has a function of supplying power to the measurement apparatus S. For example, a socket into which a plug provided at the distal end of a power cord is inserted is formed in the power supply part 4.

Structure of the Spline Bearing 21

Figure 2A:
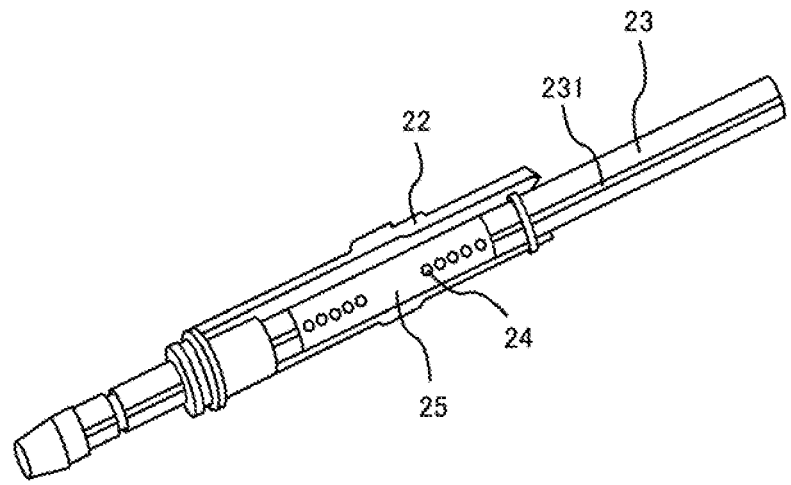
FIG. 2A shows a configuration in the vicinity of a spline bearing according to the embodiment.
Figure 2B:
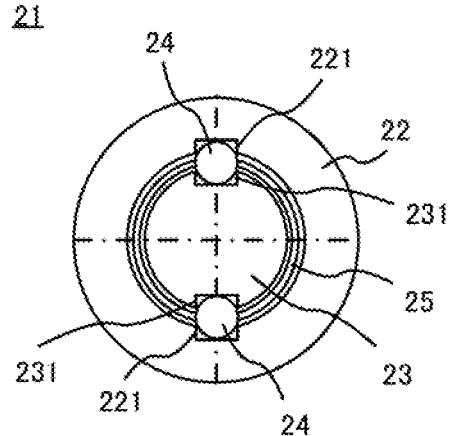
FIG. 2B is a cross-sectional view of the spline bearing according to the embodiment.

FIG. 2 shows a configuration in the vicinity of the spline bearing 21 according to the embodiment. FIG. 2A shows a configuration in the vicinity of the spline bearing 21. FIG. 2B is a cross-sectional view of the spline bearing 21.

The spline bearing 21 includes the outer cylinder 22, the shaft body 23, bearing balls 24, and a retainer 25. A first groove 221 is formed in the outer cylinder 22. A second groove 231 is formed in the shaft body 23.

The outer cylinder 22 has a plurality of first grooves 221. The first grooves 221 extend in the longitudinal direction of the outer cylinder 22 on the inner surface of the outer cylinder 22. The first grooves 221 accommodate some of the bearing balls 24. The plurality of first grooves 221 is formed adjacent to each other with predetermined spaces therebetween in the circumferential direction on the inner surface of the outer cylinder 22. The number of first grooves 221 formed on the outer cylinder 22 is arbitrary.

The bearing balls 24 are provided between the inner surface of the outer cylinder 22 and the outer surface of the shaft body 23. Each bearing ball 24 has a spherical shape, and a part of the bearing ball 24 is in contact with the first groove 221 formed in the inner surface of the outer cylinder 22. A part of the bearing ball 24 different from the part of the bearing ball 24 that contacts the inner surface of the outer cylinder 22 contacts the second groove 231 formed in the outer surface of the shaft body 23. The bearing ball 24 is rotatable about the center of the bearing ball 24, and has a function of reducing the sliding resistance of the shaft body 23 moving with respect to the outer cylinder 22. The sliding resistance is a resistance when the shaft body 23 is slid in the longitudinal direction.

The shaft body 23 has a plurality of second grooves 231. The second grooves 231 extend in the longitudinal direction of the shaft body 23 on the outer surface of the shaft body 23. The second grooves 231 accommodate some of the bearing balls 24. The plurality of second grooves 231 is formed adjacent to each other with predetermined spaces therebetween in the circumferential direction on the outer surface of the shaft body 23. The number of second grooves 231 formed on the shaft body 23 is arbitrary. The plurality of second grooves 231 is located at the same position, in the circumferential direction of the shaft body 23, with respect to the plurality of first grooves 221.

For example, a part of each bearing ball 24 is located inside a first groove 221 of the outer cylinder 22, and a part different from the part of the bearing ball 24 is located inside a second groove 231 of the shaft body 23. In this manner, a part of the bearing ball 24 is located inside the first groove 221 of the outer cylinder 22, and a part different from the part of the bearing ball 24 is located inside the second groove 231 of the shaft body 23, so that the shaft body 23 is restricted from rotating, in the circumferential direction, with respect to the outer cylinder 22.

Arrangement of the Plurality of Bearing Balls 24

Figure 3:
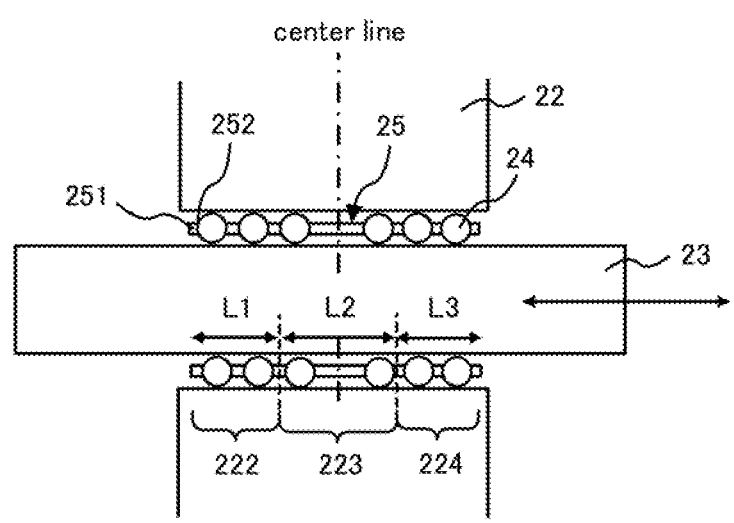
FIG. 3 shows an example of an arrangement of a plurality of bearing balls.
Figure 4A:
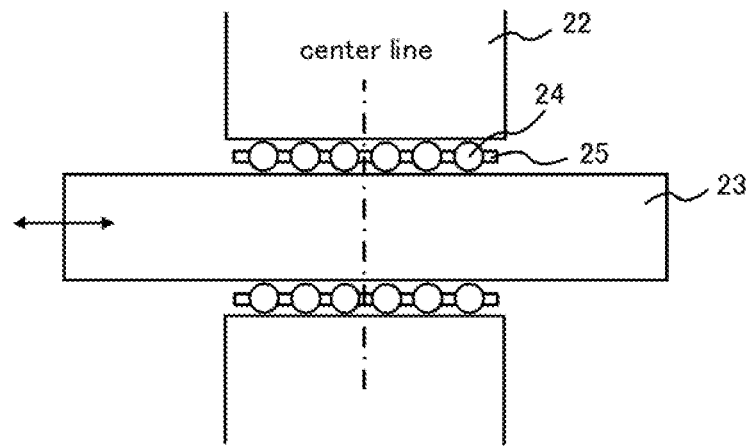
FIG. 4A shows an example of an arrangement of a plurality of bearing balls as a comparative example.

FIG. 3 shows an example of an arrangement of the plurality of bearing balls 24 in the spline bearing 21 according to the embodiment. FIG. 4 shows an example of an arrangement of the plurality of bearing balls 24 in a spline bearing 51 as a comparative example. In the spline bearing 51, the plurality of bearing balls 24 are uniformly arranged.

Figure 4B:
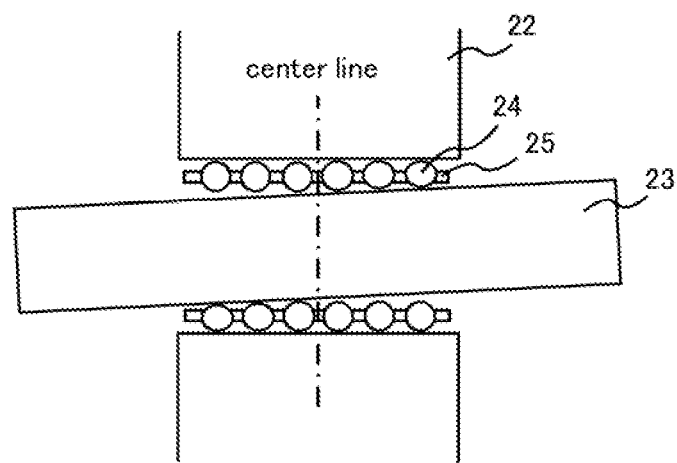
FIG. 4B shows an example of an arrangement of a plurality of bearing balls as a comparative example.

FIG. 4B shows a state in which an external force is applied to the shaft body 23 of the spline bearing 51. When the external force is applied to the spline bearing 51, the bearing balls 24 arranged at both ends of the plurality of bearing balls 24 are deformed more than the other bearing balls 24, thereby contributing to suppress inclination of the shaft body 23. That is, it is considered that the bearing balls 24 closer to the outside of the row of bearing balls 24 have a larger function of suppressing the inclination of the shaft body 23, and the bearing balls 24 near the center of the row of bearing balls 24 have a smaller function of suppressing the inclination of the shaft body 23. Therefore, it is considered that the bearing balls 24 near the center have a small degree of contribution for suppressing the inclination of the shaft body 23 even though the bearing balls 24 near the center are a factor for increasing the sliding resistance.

On the other hand, in the spline bearing 21 according to the embodiment shown in FIG. 3, the density of the bearing balls 24 in the vicinity of both ends of the outer cylinder 22 is higher than the density of the bearing balls 24 in the vicinity of the center. The density is the number of bearing balls 24 per unit length in the longitudinal direction of the outer cylinder 22. As a result, the sliding resistance of the spline bearing 21 is equivalent to the sliding resistance of the spline bearing 51 shown in FIG. 4, and the shaft body 23 of the spline bearing 21 is hardly inclined compared to the spline bearing 51 shown in FIG. 4. Hereinafter, the spline bearing 21 will be described in detail.

As shown in FIG. 3, the outer cylinder 22 has a first area 222, a second area 223, and a third area 224.

The first area 222 is an area having a first length L1 that is shorter than the entire length of the outer cylinder 22 in the longitudinal direction from one end of the outer cylinder 22. The second area 223 is an area having a second length L2 that is shorter than the entire length of the outer cylinder 22 and centered on the center position in the longitudinal direction of the outer cylinder 22. The third area 224 is an area having a third length L3 that is shorter than the entire length of the outer cylinder 22 in the longitudinal direction from the other end of the outer cylinder 22.

The first density of the bearing balls 24 in the first area 222 is larger than the second density of the bearing balls 24 in the second area 223. Further, the third density of the bearing balls 24 in the third area 224 is larger than the second density. The density is the number of bearing balls 24 per unit length in the longitudinal direction of the outer cylinder 22. By arranging the bearing balls 24 in this manner, even if an external force is applied to the shaft body 23, the shaft body 23 is hardly inclined with respect to the longitudinal direction of the outer cylinder 22.

As shown in FIG. 3, the plurality of bearing balls 24 are provided at positions symmetrical with respect to the center position in the longitudinal direction of the outer cylinder 22. Since the plurality of bearing balls 24 are arranged in this manner, the shaft body 23 is hardly inclined regardless of the position at which an external force or the like is applied to the shaft body 23.

In the example shown in FIG. 3, the first density and the third density are the same, but the first density and the third density may be different. Further, the bearing balls 24 do not have to be provided in the second area 223. In this case, the longitudinal length of the second area 223 is greater than (i) the spaces between adjacent bearing balls 24 in the first area 222 and (ii) the spaces between adjacent bearing balls 24 in the third area 224. Further, in this case, the longitudinal length of the second area 223 may be greater than at least one of (i) the spaces between adjacent bearing balls 24 in the first area 222 and (ii) the spaces between adjacent bearing balls 24 in the third area 224.

The retainer 25 has a function of retaining the plurality of bearing balls 24. The retainer 25 has, for example, a cylindrical shape, the inner diameter of the retainer 25 is slightly larger than the outer diameter of the shaft body 23, and the outer diameter of the retainer 25 is smaller than the inner diameter of the outer cylinder 22. The retainer 25 is located outside the shaft body 23 and inside the outer cylinder 22. The thickness of the retainer 25 is smaller than the diameter of a bearing ball 24. The retainer 25 is movable in the longitudinal direction in accordance with the movement of the shaft body 23 in the longitudinal direction.

The retainer 25 has a plurality of retaining parts 251. Each retaining part 251 has a function of retaining one bearing ball 24 and restricting the bearing ball 24 from moving. The number of retaining parts 251 is the same as the number of bearing balls 24. A hole 252 for receiving the bearing ball 24 may be formed in each retaining part 251. In this case, the diameter of the hole 252 is, for example, slightly larger than the diameter of the bearing ball 24 and a part having the maximum diameter of the bearing ball 24 is located inside the hole 252.

The density of the plurality of retaining parts 251 that the retainer 25 has in the area corresponding to the first area 222 is larger than the density of the plurality of retaining parts 251 that the retainer 25 has in the area corresponding to the second area 223. Further, the density of the plurality of retaining parts 251 that the retainer 25 has in the area corresponding to the third area 224 may be larger than the density of the plurality of retaining parts 251 that the retainer 25 has in the area corresponding to the second area 223. With such a configuration of the retainer 25, the density in the vicinity of both ends of the row of bearing balls 24 is larger than that in the vicinity of the center of the row of bearing balls 24 and therefore the shaft body 23 is hardly inclined.

Variation 1

Figure 5:
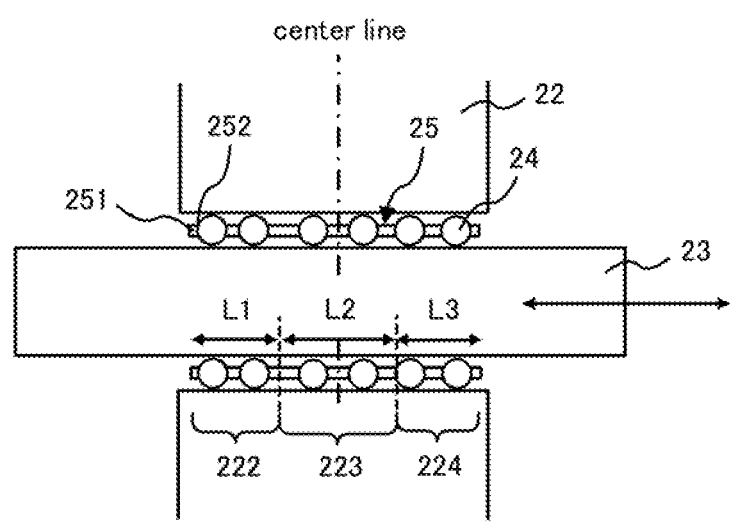
FIG. 5 shows a configuration of a spline bearing as a first variation.

FIG. 5 shows a configuration of a spline bearing 26 as a first variation. The spline bearing 26 differs from the spline bearing 21 shown in FIG. 3 in that the density of the bearing balls 24 in the third area 224 is equal to the density of the bearing balls 24 in the second area 223, and is otherwise the same. In this manner, even when only the density of the bearing balls 24 in the first area 222 is larger than the density of the bearing balls 24 in the second area 223, the shaft body 23 of the spline bearing 26 can be made harder to incline than that of the spline bearing 51 shown in FIG. 4.

Variation 2

Figure 6:
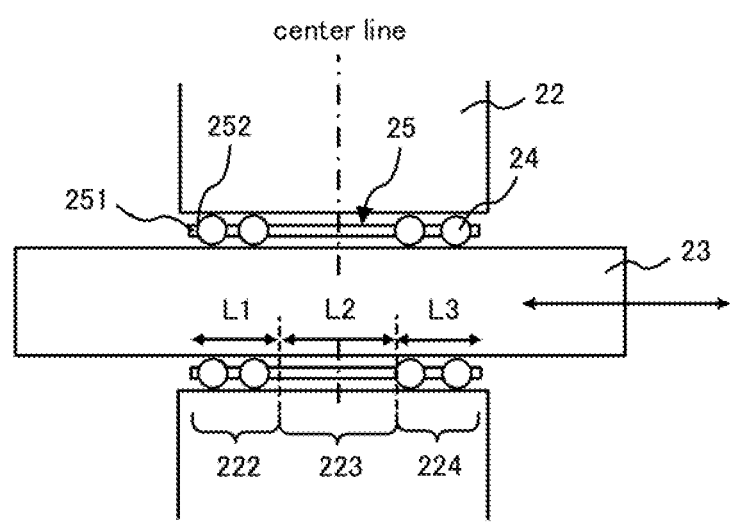
FIG. 6 shows a configuration of a spline bearing as a second variation.

FIG. 6 shows a configuration of a spline bearing 27 as a second variation. In the spline bearing 27, the bearing balls 24 included in the second area 223 are removed from the spline bearing 26 shown in FIG. 5, and the total number of bearing balls 24 is smaller than that of the spline bearing 26 shown in FIG. 5 and the spline bearing 51 shown in FIG. 4. If the bearing balls 24 disposed in the second area 223 of the spline bearing 26 have a relatively smaller function of suppressing the inclination of the shaft body 23, the number of bearing balls 24 may be reduced as in the case of the spline bearing 27, and the performance of suppressing the inclination of the shaft body 23 can be made larger than that of the spline bearing 51 while reducing the sliding resistance.

Variation 3

In the above description, the configuration of the measurement apparatus S having a spline bearing in which the bearing balls 24 are linearly arranged is exemplified, but the arrangement of the bearing balls 24 in the bearing of the measurement apparatus S is arbitrary. Further, the bearing of the measurement apparatus S is not limited to the spline bearing, and a configuration based on the same technical idea as that of the embodiment can be applied to another type of bearing (such as, a ball bush bearing).

Effect of the Measurement Apparatus S According to the Embodiment

The measurement apparatus S according to the embodiment includes the outer cylinder 22, the shaft body 23 longitudinally movable on the inner surface side of the outer cylinder 22, the plurality of bearing balls 24 provided between the inner surface of the outer cylinder 22 and the outer surface of the shaft body 23, and the measurement part 3 for measuring the relative position between the outer cylinder 22 and the shaft body 23. In the measurement apparatus S, the first density of the bearing balls 24 in the first area 222 having the first length L1 shorter than the total length of the outer cylinder 22 in the longitudinal direction from one end of the outer cylinder 22 is larger than the second density of the bearing balls 24 in the second area 223 having the second length L2 shorter than the total length of the outer cylinder 22 centered on the center position in the longitudinal direction of the outer cylinder 22.

Therefore, when the measurement apparatus S has the bearing balls 24 equivalent to those of a conventional spline bearing, the shaft body 23 is hardly inclined when an external force is applied. Further, if the number of bearing balls 24 is reduced as compared with the conventional spline bearing, the sliding resistance can be reduced and the shaft body 23 can be made to hardly incline. As described above, in the measurement apparatus S according to the embodiment, since both the sliding resistance and the inclination of the shaft body 23 can be reduced, a smooth operation and an improvement in the measuring accuracy can be realized.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A measurement apparatus comprising:
an outer cylinder;
a shaft body longitudinally movable on the inner surface side of the outer cylinder;
a plurality of bearing balls disposed between an inner surface of the outer cylinder and an outer surface of the shaft body; and
a measurement part that measures a relative position between the outer cylinder and the shaft body, wherein
a first density of the bearing balls in a first area having a first length shorter than a total length of the outer cylinder in the longitudinal direction from one end of the outer cylinder is larger than a second density of the bearing balls in a second area having a second length shorter than the total length of the outer cylinder, the second area being centered on a central position in the longitudinal direction of the outer cylinder.

2. The measurement apparatus according to claim 1, wherein
a third density of the bearing balls in a third area having a third length shorter than the total length of the outer cylinder in the longitudinal direction from the other end of the outer cylinder is larger than the second density.

3. The measurement apparatus according to claim 2, wherein
the first density and the third density are the same.

4. The measurement apparatus according to claim 2, wherein
the bearing balls are not provided in the second area, and
the longitudinal length of the second area is greater than (i) the spaces between adjacent bearing balls in the first area and (ii) the spaces between adjacent bearing balls in the third area.

5. The measurement apparatus according to claim 2, wherein
the bearing balls are not provided in the second area, and
the longitudinal length of the second area is greater than at least one of (i) the spaces between adjacent bearing balls in the first area and (ii) the spaces between adjacent bearing balls in the third area.

6. The measurement apparatus according to claim 1, wherein
the plurality of bearing balls are provided at positions symmetrical with respect to the central position in the longitudinal direction.

7. The measurement apparatus according to claim 1, further comprising:
a retainer that includes a plurality of retaining parts for retaining the plurality of bearing balls, wherein
a density of the plurality of retaining parts that the retainer has in an area corresponding to the first area is larger than a density of the plurality of retaining parts that the retainer has in an area corresponding to the second area.

8. The measurement apparatus according to claim 7, wherein
a third density of the bearing balls in a third area having a third length shorter than the total length of the outer cylinder in the longitudinal direction from the other end of the outer cylinder is larger than the second density, and
a density of the plurality of retaining parts that the retainer has in an area corresponding to the third area is larger than a density of the plurality of retaining parts that the retainer has in an area corresponding to the second area.

9. A bearing comprising:
an outer cylinder;
a shaft body longitudinally movable on the inner surface side of the outer cylinder; and
a plurality of bearing balls disposed between an inner surface of the outer cylinder and an outer surface of the shaft body, wherein
a first density of the bearing balls in a first area having a first length shorter than a total length of the outer cylinder in the longitudinal direction from one end of the outer cylinder is larger than a second density of the bearing balls in a second area having a second length shorter than the total length of the outer cylinder, the second area being centered on a central position in the longitudinal direction of the outer cylinder.

* * * * *